Feb. 1, 1966 R. B. GILLETTE ETAL 3,232,795
SOLAR ENERGY CONVERTER
Filed Oct. 26, 1961 2 Sheets-Sheet 1

INVENTOR.
ROGER B. GILLETTE
HOWARD E. SNYDER
BY RALPH J. TALLENT
Reynolds & Christensen

ATTORNEYS

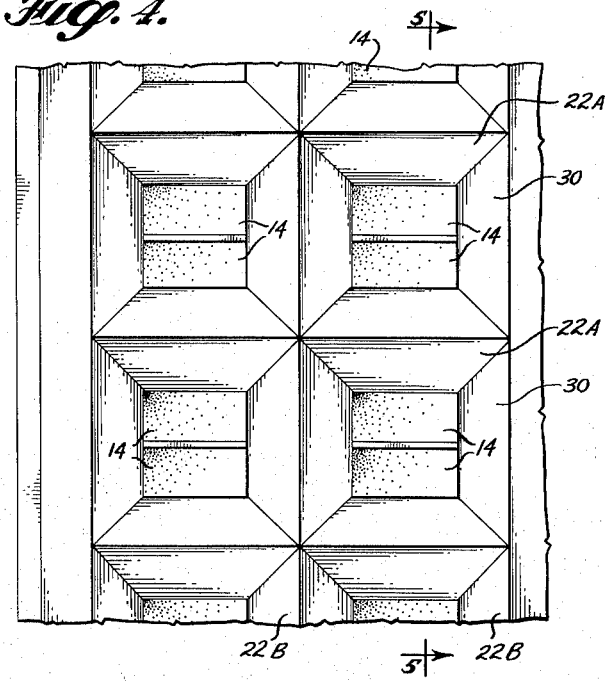
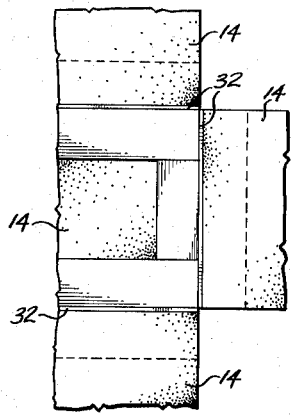
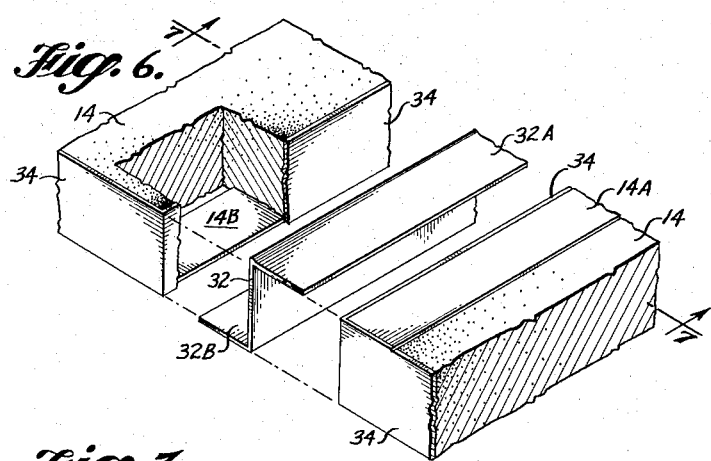
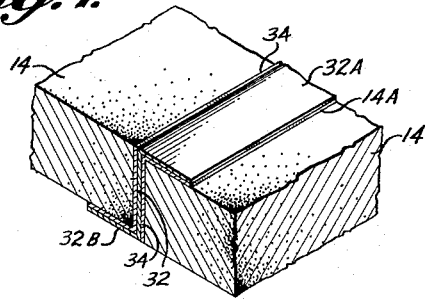
INVENTOR.
ROGER B. GILLETTE
HOWARD E. SNYDER
BY RALPH J. TALLENT
ATTORNEYS United States Patent Office 3,232,795
Patented Feb. 1, 1966

3,232,795
SOLAR ENERGY CONVERTER
Roger B. Gillette, Tukwila, Howard E. Snyder, Seattle, and Ralph J. Tallent, Auburn, Wash., assignors to The Boeing Company, Seattle, Wash., a corporation of Delaware
Filed Oct. 26, 1961, Ser. No. 147,776
12 Claims. (Cl. 136—89)

This invention relates to improvements in devices for converting light energy into electrical energy to provide electric power in outer space vehicles and the like. More specifically the invention concerns improvements in solar cell array matrix structures and in cell-supporting and connecting arrangements therein. The invention is herein illustratively described by reference to the presently preferred embodiments thereof; however, it will be recognized that certain modifications and changes therein with respect to details may be made without departing from the essential features involved.

Reliability, efficiency, compactness and lightness of weight are principal requirements of any solar cell converter to be used in space vehicles or similar applications. The cells are usually arranged in a coplanar array which exposes each to the light source. Lenses and prisms used to increase the amount of light concentrated upon the cells are generally not practicable. Their bulk and weight create a problem. Moreover, whereas they tend to overheat the cells by infrared energy, much of the useful light energy is lost by reflection from the optical surfaces. Increasing the converter power by increasing the amount of light cast upon the cells has also been attempted heretofore using inclined reflectors of wedge-like form interposed between cells in a matrix structure. Here, again, however, the attempt was largely self-defeating due to the fact that infrared energy mixed with useful wavelengths increased the cell temperature above the range of efficient operation.

About one percent loss of efficiency occurs with each 20° K. rise of temperature above the optimum value. Thus, any attempt to gather increased light and project it onto the cells of a solar energy converter without eliminating or dissipating the heat which results from infrared energy intercepted along with useful light energy of shorter wavelengths is found to be largely ineffectual.

An object of this invention is to provide a solar energy converter capable of operating at high efficiency and of producing comparatively high output power for the number of individual cells used and for the total size and weight of the converter. A related object is to provide such a converter which avoids undue rise of cell temperature due to infrared radiation. More specifically, it is an object hereof to provide a converter structure meeting the general objectives and which will dissipate absorbed heat rapidly by the process of radiation, which is, of course, the only effective means of dissipating heat energy in free space.

Still another object of this invention is to provide such a converter which is of light-weight, practicable and simple construction, and which is so devised as to minimize danger of breakage of the frangible solar cell wafers due to strain and vibration of the supporting matrix in severe operating environments.

Still other objects relate to improvements in the means for mounting and electrically interconnecting solar cell wafers in these converters, such improvements being in terms of reliability, of versatility with respect to physical and electrical arrangements of cells, and in the avoidance of stress concentrations in the cells at their points of connection.

In accordance with this invention as herein disclosed the wafer-like solar cells are mounted individually or in groups in surface-to-surface thermal transfer contact with a sheet metal matrix (preferably of aluminum or other thermally conductive material) at spaced areas thereon. Between and adjoining these areas the matrix sheet is formed with forwardly projecting wedge-like corrugations having sloping sides which reflect light energy onto the cells. The surface areas of the matrix sheet on its back and front sides are preferably both specially treated for maximum heat emissivity, such treatment on the front side at least being also compatible with high reflectivity of useful light wavelengths. Thus, the thermally conductive and emissive matrix sheet, by virtue of its thermal transfer contact with substantially the full back side areas of the cell wafers, is enabled to function in the multiple roles of a rigidified light-weight support for the frangible wafers, of an effective light gathering means and of an efficient heat sink for the temperature sensitive cells. In this manner it is now possible to produce additional power with the same number of cells by increasing the light gathering area of the converter.

In one embodiment the reflector wedges extend in parallel lines providing matrix stiffness in one direction of bending. Auxiliary stiffeners extending transversely to the reflector wedges and joined to the back side of the matrix sheet provide stiffness in a perpendicular direction of bending. In a second embodiment a waffle-like configuration of mutually transverse reflector wedges imparts stiffness to the matrix sheet in all planes of bending.

An additional feature of the invention resides in the improved manner of electrically interconnecting successively adjacent cell wafers employing a flexible, double-hinging, Z-section sheet metal strip, one flange of which overlaps the top terminal of one wafer and is soldered or otherwise electrically connected thereto, while its opposite flange overlaps and is electrically connected to the bottom terminal of the adjacent strip. The web of the Z-section is received between the proximate edges of the wafers out of electrical contact therewith. Hinging action permitted by flexure of the strip permits flexure of a chain of interconnected solar cell wafers and in this manner overcomes the usual problem of wafer stress and breakage encountered in the usual shingled arrangement of wafers soldered in series overlapping relationship. Moreover, more reliable electrical connections are provided and greater versatility in respect to the different arrangements and groupings of wafers that may be achieved electrically and physically in order to satisfy requirements of different applications. Such connector arrangements also provide increased current carrying capacity without use of heavy conductors.

These and other features, objects and advantages of the invention will become more fully evident from the following description thereof by reference to the accompanying drawings.

FIGURE 4 is a top face view of a modified device in which a different matrix form is used.

FIGURE 6 is a perspective view showing two modified solar cell wafers and a Z-section connecting strip in mutually separated relationship preparatory to assembly.

FIGURE 7 is an isometric view at reduced scale of a fragmentary edge portion of the two wafers and connector strip as assembled.

FIG. 8 is a top face view of a modified arrangement of solar cell wafers.

Typically solar cell wafers of silicon or similar frangible material are quite thin (i.e., of the order of 0.016 inch) and require a proper operating environment both thermally and physically in order to function efficiently and reliably. Flexure due to vibration or bending stresses can easily cause breakage and consequent interruption of electrical continuity. Of even greater significance herein, however, wafer temperature must be kept low (i.e., below the range of 300° to 350° Kelvin in a typical case), otherwise conversion efficiency drops seriously. In fact, a one percent loss of efficiency may be expected with every 20° rise of temperature above that range in the case of conventional silicon cells. Consequently, in converting solar light into electrical energy with these cells, any increase of light concentrated upon the cell which is also accompanied by an increase of infrared energy must, to be effective for its purpose, be augmented by means to dissipate the added heat in the cell. It is readily possible actually to reduce cell output merely by reflecting more sunlight upon it in the absence of means to maintain a low cell temperature.

Figure 1:
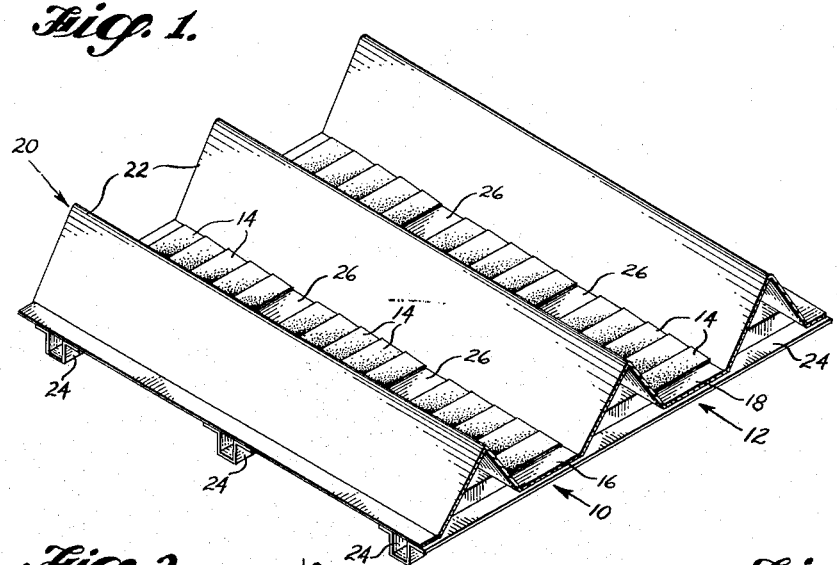
FIGURE 1 is an isometric view of a solar cell converter incorporating the invention.
Figure 2:
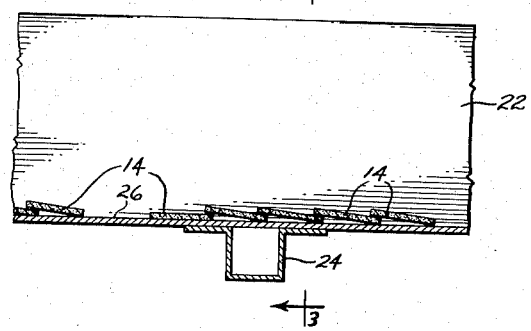
FIGURE 2 is a transverse sectional view of a portion of such a device, the view being taken on the line 2—2 in FIGURE 3 in a direction perpendicular to the extent of the reflector wedges.
Figure 3:
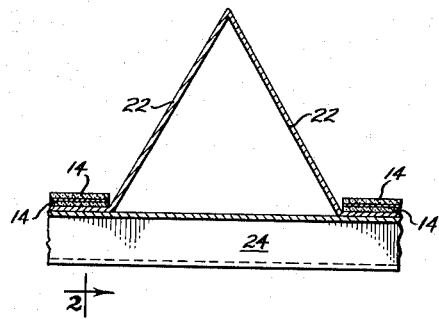
FIGURE 3 is a sectional view of a fragmentary portion of the device shown in FIGURES 1 and 2, the view being taken on line 3—3 in FIGURE 2.

As shown in FIGURES 1, 2 and 3, a converter structure embodying this invention comprises the two (or more) arrays, 10 and 12, of individual solar cell wafers 14 successively overlapped in the manner of roof shingles. Each cell is soldered or otherwise suitably electrically and physically connected to the next cell at the interface therebetween where they overlap. Such an arrangement of cells is conventional. Electrical connections external to the rows of cells are omitted from the illustration but are provided in any conventional or suitable form.

The two rows of cells, 10 and 12, in this case lie in substantial surface-to-surface thermal transfer contact with the respective valleys 16 and 18 comprising generally flat areas of the sheet metal matrix 20. This matrix is formed of thermally conductive light-weight material such as aluminum or aluminum alloy. Between and adjoining the supporting surfaces 16 and 18 the matrix sheet has wedge-like light reflectors 22, formed by bending the sheet into a forwardly projecting corrugation in the manner depicted. The sloping sides of the reflector wedges are inclined to the planes of the solar cell arrays 10 and 12 at an angle which is of the order of 60 degrees but may vary between an angle of 55 degrees or less and 70 degrees or more, depending upon such design factors as strength-to-weight requirements, area utilization, solar cell cost, etc. An optimum angle in a typical design will be 60 degrees. The reflector wedges 22 extend in parallel rows and occupy substantially the area of the matrix between the cell rows, 10 and 12. Thus, all light which is incident upon the structure which does not fall directly upon the cell surfaces falls upon the reflector surfaces and in turn is reflected onto the cells, except, of course, for any light impinging side surfaces which are not sloped down to an adjacent cell surface area. Preferably the sides of the reflector wedges are straight or linear in their length dimension and either straight or curved in their width dimensions. These reflector wedges also serve as stiffener ribs against bending of the matrix sheet 20 in a plane generally parallel to their length extent. With aluminum or aluminum alloy sheet material no thicker than about one-hundredth of an inch, for example, stiffening measures are essential.

Stiffness against bending in a plane perpendicular to the length extent of the reflector wedges 22 is imparted by securing hat-section stiffener channels 24 of similar material at spaced intervals to the back side of the matrix sheet 20, extending in parallel relationship perpendicular to the reflector wedges 22. The flanges of these stiffener channels are soldered, brazed or otherwise suitably bonded on the back side of the matrix sheet in heat transfer relationship where surface areas lie in mutual contact.

Of particular significance herein is the fact that the solar cell wafers in the rows 10 and 12 lie in direct surface-to-surface heat transfer contact with the supporting surface areas of the matrix sheet 20. Bonding of the wafers to these surface areas of the sheet may be effected by any suitable bonding agent, such as a silicone potting compound or other material possessing necessary attributes for the application. It will be recognized, however, that the choice of materials is not particularly critical and need not hinge on a high thermal conductivity inasmuch as only a thin layer of bonding adhesive is necessary to effectuate a bond between the wafers and the matrix sheet. Although in the shingled arrangement of the wafers, as shown in FIGURE 1, there is a tapered gap between the matrix backing surface and the underside of each wafer, this does not create a high impedance to heat flow between the wafer and matrix because of the fact that the gap is very thin at its maximum, i.e., less than 0.016 inch in the case of wafers of that specific thickness. Consequently, there is an efficient flow of heat from the wafers to the matrix sheet, due to the large mutually superposed areas of the proximate surfaces thereof. Thus, whenever temperature of the wafers tends to rise above that of the sheet itself there is an efficient flow of heat to the latter.

Of further significance herein, the matrix sheet itself is designed to serve as a high-rate heat dissipation device or radiator. In outer space it is, of course, more of a problem to dissipate heat than in the atmosphere since radiation is the only available method. With the improved photoelectric converters of this invention, both the back surfaces and the frontally exposed surfaces of the matrix sheet are designed to dissipate heat by radiation. These surfaces may be treated in special ways to enhance their radiation properties. Treatment of the front surfaces of the reflector wedges 22 is designed to permit efficient heat radiation at the desired operating temperature (i.e., typically between 300° K. and 350° K.) without impairing the ability of these surfaces to reflect light onto the solar cell wafers. Treatment of the back side surfaces of the matrix sheet valleys 16 and 18 and of the hat-section stiffeners 24 need not, of course, be such as will maintain their reflectivity to sunlight. Consequently, the latter surfaces may be treated differently than the front side surfaces.

In a representative case the reflective surfaces on the front sides of the wedges 22 may consist of highly reflective aluminum or aluminum alloy coated with a thin dielectric coating or coatings. Selection of a coating will be based on the requirements of a particular application. If high reflectance to sunlight is the primary consideration, the surface will have mirror-like polish and will, in the case of aluminum, be coated very lightly with a thin layer of aluminum oxide in order to stabilize the surface. In case heat dissipation and reflectivity are of equal importance, or nearly so, the coating may consist of highly polished aluminum anodized and sealed. If heat dissipation is the primary requirement and high reflectivity of light is not quite as important, the coating may comprise a 0.3 micron layer of silicon monoxide, for example, applied to an anodized and sealed aluminum surface. The back side surfaces of the structure may be treated or coated with materials which provide a high degree of emissivity in the optical wavelength region of 7 to 25 microns. Materials meeting this requirement are well known and need not be listed herein, although it may be mentioned that magnesium oxide, pigmented paint, or reflective aluminum coated with aluminum oxide to a thickness of 4 microns represent suitable coatings in different instances. When the structure is designed to operate in deep space, high infrared emissivity becomes even more important and may be achieved by either anodizing a silicon-aluminum alloy or by pigmenting the anodized coating.

Another feature of the invention is also illustrated in FIGURE 1, wherein the shingled solar cell wafer rows 10 and 12 are not continuous, but are interrupted at intervals by the gaps 26. Preferably these gaps are formed at intervals of about every five wafers (i.e., ten at the most, and five as an optimum). It is found that if thin gauge sheet metal is used in the matrix sheet these gaps add greatly and in some cases are essential to the effective transfer of heat to the radiating surfaces of the sheet so as to maintain a sufficiently low cell temperature. These gaps provide shorter path lengths for flow of heat from the cells to the radiating surfaces of the sheet metal, so as to reduce temperature gradients along the sheet to a minimum.

It will also be observed that where temperatures in the matrix sheet metal are highest due to transfer of heat from the wafers (i.e., directly behind the wafers) the immediately and most proximately available radiation surfaces of the sheet may be treated for highest emissivity (i.e., on the back side of the sheet at the base of the troughs 16 and 18 between reflector wedges).

Figure 5:
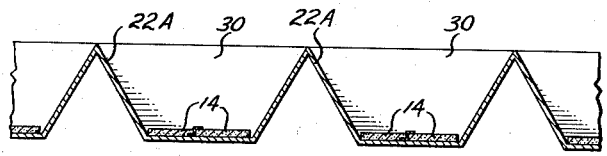
FIGURE 5 is a transverse sectional view taken on line 5—5 in FIGURE 4.

In FIGURES 4 and 5 a waffled matrix sheet configuration is employed, with wedges 22a extending in one direction and wedges 22b extending in a perpendicular direction in order to form the recesses or pockets 30 in which solar cell wafers 14 are mounted in position to receive reflected light from reflector surfaces surrounding them on all sides. In this case only two cells are mounted in each of the respective pockets. The back side stiffener channels 24 are not required in this embodiment because of the stiffness effect imparted in all planes by reason of the mutually perpendicular arrangement of reflector wedges.

A preferred technique for electrically interconnecting successively adjacent cell wafers is shown in FIGURE 5 and is elaborated in more detail in FIGURES 6 and 7. This comprises the use of sheet metal Z-section connector strips 32 which have flanges 32a and 32b adapted to overlap and be soldered to the respective top and bottom terminals 14a and 14b of mutually adjacent wafers 14. The side edges of the wafers are preferably dielectrically coated, as indicated at 34 to prevent undesired electrical contacts between the cell terminals and accidental shorting between the positive and negative surfaces of individual cells. The Z-section connector strips, being of thin material, serve as a double hinge permitting relative angular displacement between interconnected wafers 14 by bending of or flexure in the connector at either of its two web edges, without causing stressing of the individual wafers and breakage as a result thereof. This connecting arrangement thereby overcomes the disadvantage of undue vulnerability to breakage encountered in shingled lay-ups of wafers wherein the wafers are soldered together into a rigid composite structure without allowance for flexure. Moreover, versatility is accomplished in that the cell wafers may be interconnected in different patterns or configurations without interference between overlapping edges as would be experienced in the case of shingled arrangements other than straight rows of wafers. An example of an arrangement permitted by the use of these connectors is depicted in FIGURE 8 wherein four wafers 14 are interconnected by the three connectors 32 with three of the wafers arranged in a straight line and the fourth connected to the side edge of the middle one in the group of three. These wafers may all be of the same size, yet there will be no interference between edges of the wafers at the corners where the fourth wafer joins the other three.

With the improved connecting arrangement, strong soldered joints between the connecting Z-section strips and the wafers provide reliable electrical connections, not always achieved heretofore in the shingled arrangement. In addition, the use of these connecting strips permits achieving somewhat closer surface-to-surface contact between the back sides of the wafers and the underlying surfaces of the matrix sheet in order to provide increased thermal transfer efficiency between them. This is possible inasmuch as the sheet material used in the connector strips may be made considerably thinner than the wafers themselves.

These and other aspects of the invention will be recognized from the foregoing description on the basis of the preferred embodiments thereof.

We claim as our invention:

1. A solar energy converter comprising a plurality of light sensitive elements having a conversion efficiency characteristic which decreases with rising temperature, and a supporting matrix for said elements comprising a thermally conductive and emissive metal sheet upon selected spaced-apart surface areas of which said elements are mounted in light-receiving position having substantially full back sides thereof joined in surface-to-surface thermal transfer contact with the sheet, said sheet having frontally projecting individual wedge-like reflector corrugations occupying the respective regions between and immediately adjoining said elements, said corrugations being formed with sloping sides which gather and reflect light onto said elements and which have exposed front and back surfaces to radiate heat transferred thereto by conduction from said surface areas, the back sides of the sheet in such surface areas also being exposed to radiate heat.

2. The solar energy converter defined in claim 1, wherein the elements are arranged in transversely spaced rows and the individual corrugations extend only in directions parallel to the rows, and wherein the matrix additionally comprises stiffeners extending transversely to the direction of the rows and joined in thermal transfer contact to the back side of the sheet at spaced intervals thereon.

3. The solar energy converter defined in claim 1, wherein the corrugations are formed in two series the members of each of which are substantially parallel, with the members of one series extending transversely to those of the other series and in intersecting relationship therewith.

4. The solar energy converter defined in claim 1, wherein the back side surfaces of the matrix sheet are specially coated to enhance infrared emissivity at a wavelength in the region of the order of 7 to 25 microns.

5. The solar energy converter defined in claim 1, wherein the back side surfaces of the matrix sheet are specially coated to enhance infrared emissivity at a wavelength in the region of the order of 7 to 25 microns, and the front side surfaces of the reffector corrugations are specially coated with a dielectric layer which increases thermal emissivity while maintaining light reflectivity thereof.

6. The solar energy converter defined in claim 5, wherein the matrix sheet comprises aluminum and the dielectric coating on the front side surfaces comprises an anodizing layer covered by a silicon monoxide layer.

7. A solar energy converter comprising a thermally conductive matrix sheet of corrugated form having ridge portions with sloping sides adjoining and projecting forwardly from generally flat base portions, light sensitive elements mounted in substantially complete surface-to-surface thermal transfer contact with said base portions to receive direct light energy and also light energy reflected upon the same from said sloping sides, said matrix sheet having front and rear thermally emissive surfaces which radiantly dissipate heat transferred to them by the light sensitive elements, thereby to maintain a reduced operating temperature in the latter conducive to efficient photoelectric energy conversion.

8. The converter defined in claim 7, wherein the corrugations run only in one direction on the sheet and the converter further comprises elongated stiffener strips joined to the back side of the sheet in transversely spaced relationship extending generally transversely to the direction of extent of the corrugations.

9. The converter defined in claim 7, wherein the matrix sheet is of waffled configuration comprising different sets of corrugations which extend in mutually intersecting transverse relationship imparting stiffness to the sheet against bending in all planes perpendicular thereto.

10. The converter defined in claim 7, wherein at least two separate light-sensitive elements of frangible wafer-like form are mounted in proximate edge-to-edge relationship upon each of said base portions, such elements having electric terminals on their front and back faces, respectively, adjacent the proximate edges of the elements, and a Z-section, flexible, electrically conductive connector strip having a web portion received in unbonded face-to-face relationship between the proximate edges of the elements and extending along the length thereof, and having oppositely directed flange portions overlapping said front and back faces of the elements and bonded to their electric terminals in electrically conductive relationship therewith, respectively.

11. In a solar energy converter, a matrix sheet supporting a plurality of light-sensitive elements of frangible wafer-like form having back sides bonded to the matrix sheet, with such elements positioned in proximate edge-to-edge relationship, such elements having electric terminals on their front and back faces, respectively, adjacent the proximate edges of the elements, and a Z-section, flexible, electrically conductive connector strip having a web portion received in unbonded relationship between the proximate edges of the elements and extending along the length thereof, and having oppositely directed flange portions overlapping said front and back faces of the elements and bonded to their electric terminals in electrically conductive relationship therewith, respectively, whereby hinging flexure of the connector strip permits relative angular displacement of the elements accompanying flexure of the matrix sheet with minimum stress incurred in such elements thereby.

12. In a solar energy converter, a matrix sheet supporting a plurality of light-sensitive elements of frangible wafer-like form having back sides bonded to the matrix sheet, with such elements positioned in proximate edge-to-edge relationship, such elements having electric terminals on their front and back faces, respectively, adjacent the proximate edges of the elements, and a flexible electrically conductive connector strip having a flexible web portion received in unbonded relationship between the proximate edges of the elements, and having opposite flange portions overlapping the faces of the elements and bonded to their electric terminals in electrically conductive relationship therewith, respectively, whereby hinging flexure of the connector strip permits relative angular displacement of the elements accompanying flexure of the matrix sheet with minimum stress incurred in such elements thereby.

References Cited by the Examiner
UNITED STATES PATENTS

| | | | |
|---|---|---|---|
| 2,904,612 | 9/1959 | Regnier | 136—89 |
| 2,989,575 | 6/1961 | Wallace | 136—89 |
| 3,005,862 | 10/1961 | Escoffery | 136—89 |

ALLEN B. CURTIS, *Primary Examiner.*

JOHN H. MACK, *Examiner.*

J. BARNEY, *Assistant Examiner.*